(12) United States Patent
Nakagawa

(10) Patent No.: US 8,656,970 B2
(45) Date of Patent: Feb. 25, 2014

(54) PNEUMATIC RADIAL TIRE FOR MOTORCYCLE

(75) Inventor: Hidemitsu Nakagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1322 days.

(21) Appl. No.: 11/914,524

(22) PCT Filed: Apr. 3, 2006

(86) PCT No.: PCT/JP2006/307035
§ 371 (c)(1),
(2), (4) Date: Nov. 15, 2007

(87) PCT Pub. No.: WO2006/123480
PCT Pub. Date: Nov. 23, 2006

(65) Prior Publication Data
US 2009/0078349 A1    Mar. 26, 2009

(30) Foreign Application Priority Data

May 17, 2005    (JP) ................................. 2005-144379

(51) Int. Cl.
*B60C 11/03* (2006.01)

(52) U.S. Cl.
USPC .................. 152/209.11; 152/209.28; 152/904

(58) Field of Classification Search
USPC ................. 152/209.11, 209.28, 904
See application file for complete search history.

(56) References Cited

U.S. PATENT DOCUMENTS

| | | | |
|---|---|---|---|
| 2,104,532 A | 4/1938 | Sommer | |
| 6,220,320 B1 * | 4/2001 | Nakagawa et al. | ...... 152/209.11 |
| D469,736 S * | 2/2003 | Steinbach | ..................... D12/535 |
| D543,142 S * | 5/2007 | Itoi | .............................. D12/535 |
| 2006/0219342 A1 * | 10/2006 | Steinbach | ................ 152/209.11 |

FOREIGN PATENT DOCUMENTS

| | | |
|---|---|---|
| EP | 0 561 326 A1 | 9/1993 |
| EP | 0 822 103 A1 | 2/1998 |
| EP | 1 508 456 A2 | 2/2005 |

(Continued)

OTHER PUBLICATIONS

Machine translation for Japan 2001-030719 (no date).*

(Continued)

*Primary Examiner* — Steven D Maki
(74) *Attorney, Agent, or Firm* — Sughrue Mion, PLLC

(57) ABSTRACT

There is provided a pneumatic radial tire for a motorcycle enabling safe running the motorcycle in conformity to various road conditions by achieving both performances of wet performance, i.e., hydroplaning and traction performances in particular, and linearity in handling at high level. In the pneumatic radial tire for a motorcycle, (a) tilt lug grooves are disposed at a tilt angle of 5 to 85° relative to a tire circumferential direction, (b) a ratio of the minimum length Lmin thereof to the surface length W thereof along one side of a tread is 0.1 or higher, (c) two groups of the tilt lug grooves are formed of two or more tilt lug grooves disposed substantially in parallel from each other, (d) they are formed of a first group of tilt lug grooves (G1) formed in a shape of chevron and a second group of tilt lug grooves (G2) formed in a shape of reversed chevron, (e) the G1 and G2 groups are alternately disposed in the circumferential direction, and (f) the G1 and G2 groups are mutually disposed on both sides of the equator of the tire line-symmetrically with respect to the equator and with an offset in the circumferential direction.

5 Claims, 3 Drawing Sheets

(56) References Cited

FOREIGN PATENT DOCUMENTS

| | | | |
|---|---|---|---|
| JP | 63-121505 A | | 5/1988 |
| JP | 63-159109 A | | 7/1988 |
| JP | 63-315307 A | * | 12/1988 |
| JP | 3-135802 A | | 6/1991 |
| JP | 04-254205 | * | 9/1992 |
| JP | 05-286306 | * | 11/1993 |
| JP | 6-55909 A | | 3/1994 |
| JP | 9-48214 A | | 2/1997 |
| JP | 10-297218 A | | 11/1998 |
| JP | 2001-030719 | * | 2/2001 |
| JP | 2005-067223 A | | 3/2005 |
| WO | 2004/014668 | * | 2/2004 |
| WO | 2005/005169 | * | 1/2005 |
| WO | 2005/005169 A1 | | 1/2005 |

OTHER PUBLICATIONS

Machine translation for Japan 05-286306 (no date).*
Machine translation for Japan 04-254205 (no date).*
European Office Action dated Mar. 5, 2009 (6 pages).

* cited by examiner (a)

(b)

PNEUMATIC RADIAL TIRE FOR MOTORCYCLE

TECHNICAL FIELD

The present invention relates to a pneumatic radial tire for a motorcycle (referred also simply as a "tire for a motorcycle" or a "tire" hereinafter) and more specifically to a pneumatic radial tire for a motorcycle whose various performances are improved in a well-balanced manner by improving a tread pattern.

BACKGROUND ART

Hitherto, various studies have been conducted on the improvement of wet performance of a pneumatic radial tire for a motorcycle. In particular, as a technology for improving the wet performance by improving a tread pattern, it has been known that lug grooves have to be distributed in a shape of chevron with respect to an advancing direction to enhance a hydroplaning performance. Meanwhile, it is necessary to bring out an edge effect by distributing the lug grooves in a shape of reversed chevron with respect to the advancing direction in order to assure a wet traction performance.

However, it has been pointed out that safety in running is lost if the lug grooves are additionally distributed in the shape of reversed chevron that brings out the edge effect for obtaining the wet traction performance to the lug grooves distributed in the shape of chevron to meet the two kinds of wet performances in the same time because uniformity of rigidity balance is lost and linearity in handling drops in a process of turning from straight running.

As a technology for improving the tread pattern of a motorcycle tire, Patent Document 1 describes a pneumatic radial tire for a motorcycle in which a set of right and left lug groove patterns is formed into a shape of reversed W as a whole with respect to a tire rolling direction, regions where right and left intermediate bending points P of the reversed W are positioned in a predetermined range of a half-width TW of developed tire from a center circumference of the tire and angles of lug groove components near a tire shoulder portion from the bending point P and near the tire center circumferential line form predetermined angles respectively with respect to an equator of the tire. Patent Documents 2 through 4 also describe technologies for improving performances of motorcycle tires by improving tread patterns.

Patent Document 1: Japanese Unexamined Patent Application Publication No. 10-297218 (Claims and others)

Patent Document 2: Japanese Unexamined Patent Application Publication No. 6-55909 (Claims and others)

Patent Document 3: Japanese Unexamined Patent Application Publication No. 3-135802 (Claims and others)

Patent Document 4: Japanese Unexamined Patent Application Publication No. 63-121505 (Claims and others)

DISCLOSURE OF INVENTION

Problems to be Solved by the Invention

Although various studies and proposals have been made so far concerning to the improvement of the tread pattern of motorcycle tires, they could not fully solve the problem of compatibility of the wet performance and the dry performance as described above.

Then, it is an object of the invention to provide a pneumatic radial tire for a motorcycle enabling safe running of a motorcycle by conforming to various road conditions by achieving the both wet and dry performances, i.e., hydroplaning and traction performances in particular, and linearity in handling at high level.

Means for Solving the Problems

As described above, it is preferable to mix the grooves depicting the shape of chevron and the grooves depicting the shape of reversed chevron with respect to the advancing direction in order to achieve the both hydroplane and traction performances. However, the distribution of the rigidity becomes non-uniform and the linearity in handling is lost because the low rigidity part is locally created if the grooves in the shape of reversed chevron are disposed between or by the side of the grooves in the shape of chevron.

Then, as a result of ardent study of the optimum distribution of the lug grooves depicting the shape of chevron and the lug grooves depicting the shape of reversed chevron with respect to the advancing direction from the point of view described above, the inventor have found that the linearity in handling may be kept while achieving the both performances of hydroplane and the traction by dividing the lug grooves into a group of lug grooves in the shape of chevron and a group of lug grooves in the shape of reversed chevron and by disposing the respective groups so that they become symmetrical alternately in the circumferential direction and with a predetermined offset on the right and left sides of the tread face and have consummated the invention.

That is, a pneumatic radial tire for a motorcycle in which a directional pattern composed of two groups of tilt lug grooves composed of sets of tilt lug grooves is formed on a tread face portion, (a) the tilt lug grooves are disposed at a tilt angle of 5 to 85° with respect to a circumferential direction of the tire, (b) the tilt lug grooves are formed so that a ratio Lmin/W of their minimum length Lmin to a surface length W along one side of the tread from the equator of the tire to the edge of the tread is 0.1 or higher in a no-load state in which the tire is mounted to a standard rim and air is filled to a standard internal pressure, (c) the two groups of the tilt lug grooves are formed of two or more tilt lug grooves disposed substantially in parallel from each other, (d) the two groups of the tilt lug grooves are formed of a first group of tilt lug grooves (G1) formed in a shape of chevron and a second group of tilt lug grooves (G2) formed in a shape of reversed chevron on the right and left sides of the tread face when seen from above when the tire is mounted to a vehicle, (e) the G1 and G2 groups are alternately disposed in the circumferential direction, and (f) the G1 and G2 groups are mutually disposed on both sides of the equator of the tire line-symmetrically with respect to the equator and with an offset in the circumferential direction.

The "standard" mentioned here is the standard defined by effective industrial standards in regions where tires are produced or used. For example, they are defined in the Year Book of the Tire and Rim Association Inc. in the US., in Standards Manual of the European Tire and Rim Technical Organization in Europe and in JATMA Year Book of Japan Automobile Tire Manufacturers Association in Japan. Accordingly, the standard inner pressure is air pressure to the maximum load (maximum load capacity) of single wheel in an applied size described in the standards described above and the standard rim is a standard rim (or "Approved Rim" and "Recommended Rim") in the applied size described in the standards described above.

Advantages

According to the invention, it became possible to achieve the both wet performances, i.e., the hydroplaning and traction performances in particular, and linearity in handling at high level by arranging the tire as described above and thereby to realize the pneumatic radial tire for a motorcycle enabling safe running of a motorcycle by conforming to various road conditions.

Figure 1:
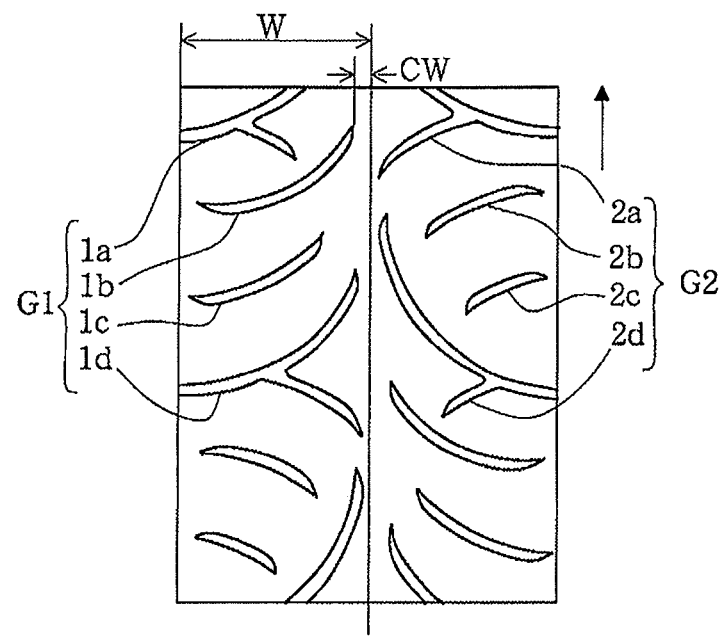
FIG. 1 is a plan view showing an outline of a tread pattern of a pneumatic radial tire for a motorcycle according one example of the invention.

REFERENCE NUMERALS 1a through 1d, 2a through 2d, 3a through 3c, 4a through 4c, 5a through 5c, 6a through 6c: TILTED LUG GROOVE
11: BEAD PORTION
12: SIDEWALL PORTION
13: TREAD PORTION
14: CARCASS
15: SPIRAL MAIN BELT LAYER

BEST MODE FOR CARRYING OUT THE INVENTION

A best mode of the invention will be explained below in detail.

FIG. 1 is a plan view showing an outline of a tread pattern of a pneumatic radial tire for a motorcycle according one example of the invention. As shown in the figure, in a tire of the invention, a directional pattern composed of two groups of tilt lug grooves composed of a set of tilt lug grooves is formed on the tread face. In the example shown in the figure, two groups G1 and G2 of tilt lug grooves composed of four tilt lug grooves 1a through 1d and 2a through 2d, respectively, form the directional pattern. It is noted that an arrow in the figure indicates a tire rotating direction. The invention is characterized in that such tilt lug grooves and groups of the tilt lug grooves are disposed at predetermined position shown below.

(a) The tilt lug grooves of the tire of the invention must be disposed at a tilting angle of 5 to 85° with respect to a circumferential direction of the tire from a tread center region to a tread end. No drain effect is obtained if the angle of the tilt lug groove is less than 5° and no edge effect is brought out if the angle exceeds 85°.

Furthermore, (b) the tilt lug grooves of the tire of the invention are formed so that a ratio Lmin/W of their minimum length Lmin to a surface length W along one side of the tread from the equator of the tire to the edge of the tread is 0.1 or higher in a no-load state in which the tire is mounted to a standard rim and air is filled to a standard internal pressure. When this ratio Lmin/W is less than 0.1, the hydroplaning performance and the edge effect are barely brought out.

It is also preferable to arrange so that a ratio Lmax/W of a maximum length Lmax of the tilt lug groove within the respective groups of tilt lug grooves to the surface length W along one side of the tread from the equator of the tire to the edge of the tread meets $0.4 \leq Lmax/W \leq 2.0$ in the no-load state in which the tire is mounted to the standard rim and air is filled to the standard internal pressure. The hydroplaning performance and the edge effect are not brought out when Lmax/W is less than 0.4 and a turning force drops and the handling performance degrades when the tire rigidity becomes too low when the value exceeds 2.0. In the same manner, it is preferable to arrange so that a ratio Lmin/W of a minimum length Lmin of the tilt lug groove within the respective groups of tilt lug grooves to the surface length W along one side of the tread from the equator of the tire to the edge of the tread meets $0.1 \leq Lmin/W \leq 1.0$ in the no-load state in which the tire is mounted to the standard rim and air is filled to the standard internal pressure. The hydroplaning performance and the edge effect are not brought out when Lmin/W is less than 0.1 and the turning force drops and the handling performance degrades when the tire rigidity becomes too low when the value exceeds 1.0. It is preferable to arrange so that two or more tilt lug grooves having the maximum length Lmax and the lug grooves having the minimum length Lmin exist within each group of tilt lug grooves.

Furthermore, (c) the two groups of the tilt lug grooves are each formed of two or more pairs of tilt lug grooves and (d) the two groups of the tilt lug grooves are formed of a first group of tilt lug grooves (G1) and a second group of tilt lug grooves (G2). Each pair of tilt lug grooves of the first group of tilt lug grooves (G1) is disposed in the tread face portion in an arrangement corresponding to an arrangement obtained by separating a chevron into two halves symmetrically with respect to the tire equator such that one half of the chevron is provided on the right side of the tread face portion and the other half of the chevron is provided on the left side of the tread face portion, and then offsetting the two chevron halves in the circumferential direction. The tilt lug grooves of the first group of tilt lug grooves (G1) on the right side of the tread face portion are disposed substantially in parallel with each other and tilt lug grooves of the first group of tilt lug grooves (G1) on the left side of the tread face portion are disposed substantially in parallel with each other. Furthermore, each pair of tilt lug grooves of the second group of tilt lug grooves (G2) is disposed in the tread face portion in an arrangement corresponding to an arrangement obtained by separating a reverse chevron into two halves symmetrically with respect to the tire equator such that one half of the reverse chevron is provided on the right side of the tread face portion and the other half of the reverse chevron is provided on the left side of the tread face portion, and then offsetting the two reverse chevron halves in the circumferential direction. The tilt lug grooves of the second group of tilt lug grooves (G2) on the right side of the tread face portion are disposed substantially in parallel with each other and tilt lug grooves of the second group of tilt lug grooves (G2) on the left side of the tread face portion are disposed substantially in parallel with each other. Finally, (e) the G1 and G2 groups are alternately disposed in the circumferential direction. Pitches of these two groups of tilt lug grooves are not specifically defined, they may be around one-third to 1/12 of an entire circumferential length, respectively, and the offset in the circumferential direction may be around 1/6 to 1/24 of the entire circumferential length, respectively.

Preferably, the G1 and G2 groups are disposed with alternately overlapping in the circumferential direction as shown in the figure. Because the directionality of rigidity of the G1 and G2 groups is different, changes of rigidity in the circumferential direction in boundary parts of the G1 and G2 groups may be smoothed and the steering performance may be more linearized by disposing them so as to partially overlap.

Figure 2:
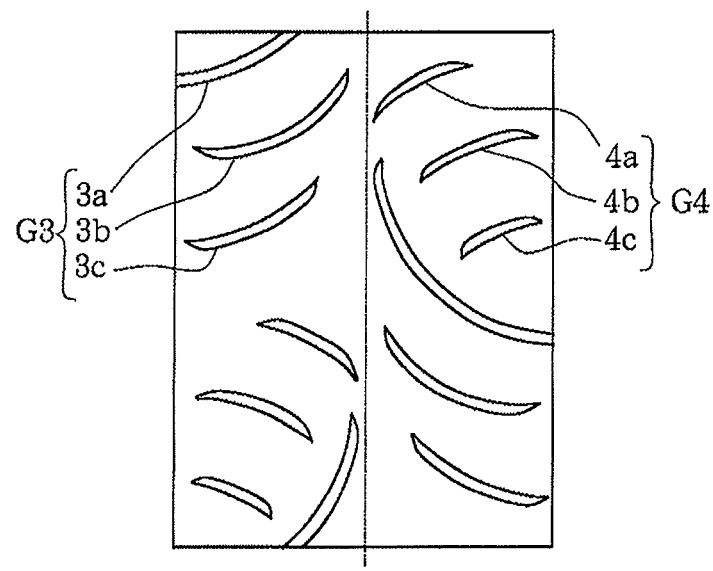
FIGS. 2(a) and 2(b) are plan views showing outlines of tread patterns of a pneumatic radial tire for a motorcycle according to another example of the invention.
Figure 2:
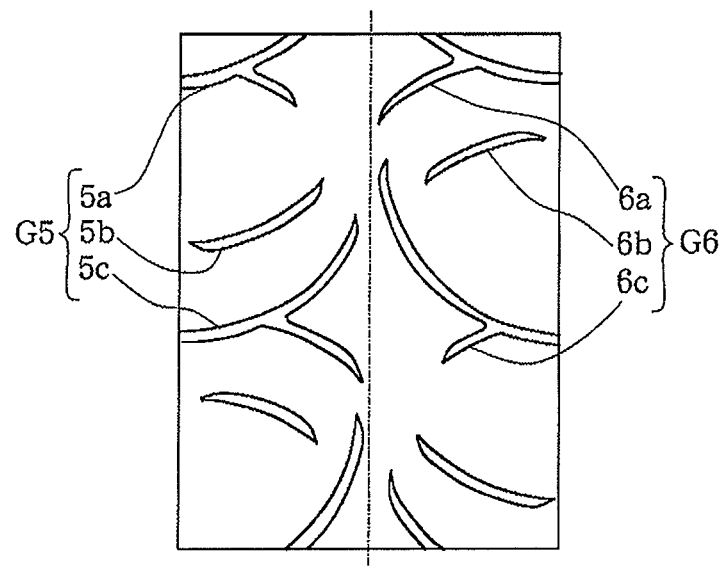

FIGS. 2(a) and 2(b) are plan views showing outlines of tread patterns of the tire according to another example of the invention. Two groups of tilt lug grooves G3 and G4 respectively composed of three tilt lug grooves 3a through 3c and 4a through 4c disposed substantially in parallel are formed without overlapping in the circumferential direction in the example shown in FIG. 2(a) and two groups of tilt lug grooves G5 and G6 respectively composed of three tilt lug grooves 5a through 5c and 6a through 6c disposed substantially in parallel are formed by overlapping in the circumferential direction in the example shown in FIG. 2(b).

The tire of the invention has at least one center rib continuing in the circumferential direction on the equator of the tire and a ratio CW/W of a width of the center rib CW to the surface length W along one side of the tread from the equator of the tire to the edge of the tread is preferable to be 0.01 or higher and 0.3 or less in the no-load state in which the tire is mounted to the standard rim and air is filled to the standard internal pressure. Wear resistance drops due to lack of pattern rigidity of the center portion when the value of CW/W is less than 0.01 and the drainage degrades when the value exceeds 0.3. It is noted that although it is not preferable to dispose the groove in the circumferential direction within the center rib from the points of view of the wear resistance and steering stability, it may be disposed within allowable groove width and groove depth corresponding to severity of the tread face required for each tire.

It is noted that from a point of view of assuring the hydroplaning performance, the tire of the invention is preferable to arrange so that the groups of tilt lug grooves including tilt lug grooves whose tilt angle with respect to the tire circumferential direction is least and the surface length along the groove is longest among the two groups of tilt lug grooves, when the vehicle advancing direction is seen to be front from the above when the tire is mounted to the vehicle, are mounted on the rear wheel of the vehicle so that they form the shape of chevron on the right and left sides of the tread face.

Figure 3:
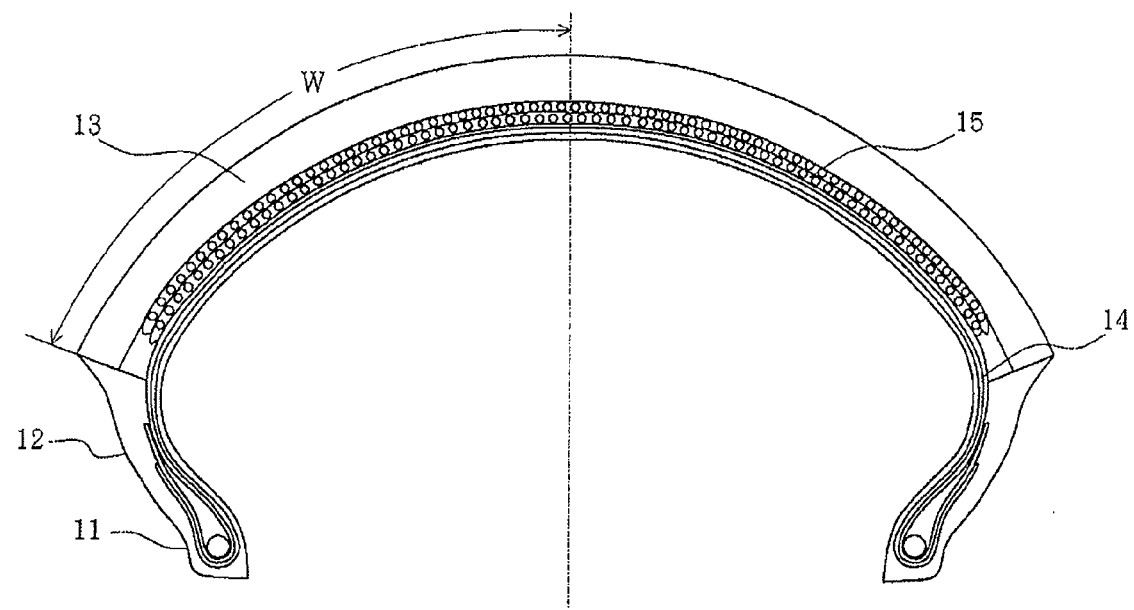
FIG. 3 is a section view of the pneumatic radial tire for a motorcycle according to one example of the invention.

While the predetermined effects of the invention may be obtained by the tire of the invention on which the predetermined directional pattern including the groups of tilt lug grooves are formed on the tread face, it may be arranged specifically so as to have a sectional structure as shown in FIG. 3 for example. The tire shown in the figure has a pair of right and left bead portions 11, a pair of sidewall portions 12 extending from the bead portions 11 toward the outside in the tire radial direction and a tread portion 13 extending between the both sidewall portions 12 in toroidal. These portions are reinforced by at least one layer or two layers, in the example shown in the figure, of carcass 14. Furthermore, a spiral main belt layer 15 composed of at least one layer or two layers of ply in the example shown in the figure is disposed between the carcass 14 and the tread portion 13. The carcass ply is formed by rubber-covered textile cords disposed in parallel from each other in the radial direction. Preferably, highly elastic textile cords are used. A belt ply is formed by rubber-covered cords wound in spiral substantially in parallel in the tire circumferential direction. Inextentional highly elastic cords are preferably used as the cords and are formed in the same width with a width of a tread normally.

Embodiments

The invention will be explained in detail below by using embodiments thereof.

The pneumatic radial tire for a motorcycle having the tread pattern and the sectional structure as shown in FIGS. 1 and 3 has been fabricated in accordance to the following table 1 and with a size of MCR180/55ZR17M/C, a rim size of MT5.5×17 and inner pressure of 250 kPa.

<Evaluation of Real Vehicle Steering Stability>

Specimen tires obtained from the respective embodiments and comparative examples were mounted to a motorcycle of 1000 cc of displacement to evaluate the steering stability by the real motorcycle from the respective points of view of performances of hydroplane, wet traction and handling. The results were shown by indices. The larger the numeric value, the better the result is.

TABLE 1

| | Lug Groove Angle (°) | Lmin/W | Lmax/W | CW/W | Hydroplaning Performance | Wet Traction Performance | Handling Performance |
|---|---|---|---|---|---|---|---|
| First Embodiment | 30 | 0.4 | 1.4 | 0.05 | 115 | 110 | 110 |
| Second Embodiment | 30 | 0.8 | 1.4 | 0.05 | 120 | 115 | 105 |
| Third Embodiment | 10 | 0.4 | 1.4 | 0.05 | 105 | 115 | 115 |
| Fourth Embodiment | 30 | 0.4 | 0.8 | 0.05 | 110 | 105 | 115 |
| Fifth Embodiment | 30 | 0.4 | 1.4 | 0.1 | 110 | 108 | 115 |
| First Comparative Example | 30 | 0.05 | 0.5 | 0.05 | 90 | 90 | 105 |
| Second Comparative Example | 3 | 0.4 | 1.4 | 0.05 | 80 | 105 | 105 |

As it is apparent from the results shown in Table 1, it was conformed that the wet performances of hydroplane and wet traction and the handling performance were both achieved at high level in the tire of the embodiment in which the two groups of tilt lug grooves composed of the predetermined tilt lug grooves are provided on the tread face portion.

The invention claimed is:

1. A pneumatic radial tire for a motorcycle in which a directional pattern composed of two groups of tilt lug grooves is formed on a tread face portion, characterized in that:
   (a) said tilt lug grooves are disposed at a tilt angle of 5 to 85° with respect to a circumferential direction of the tire; and (b) said tilt lug grooves are formed so that a ratio Lmin/W of their minimum length Lmin to a surface length W along one side of the tread from the equator of the tire to the edge of the tread is 0.1 or higher in a no-load state in which the tire is mounted to a standard rim and air is filled to a standard internal pressure;

(c) said two groups of the tilt lug grooves are each formed of two or more pairs of tilt lug grooves;

(d) said two groups of the tilt lug grooves are formed of a first group of tilt lug grooves (G1) and a second group of tilt lug grooves (G2), wherein each pair of tilt lug grooves of the first group of tilt lug grooves (G1) is disposed in the tread face portion in an arrangement corresponding to an arrangement obtained by separating a chevron into two halves symmetrically with respect to the tire equator such that one half of the chevron is provided on the right side of the tread face portion and the other half of the chevron is provided on the left side of the tread face portion, and then offsetting the two chevron halves in the circumferential direction, wherein tilt lug grooves of the first group of tilt lug grooves (G1) on the right side of the tread face portion are disposed substantially in parallel with each other and tilt lug grooves of the first group of tilt lug grooves (G1) on the left side of the tread face portion are disposed substantially in parallel with each other, and wherein each pair of tilt lug grooves of the second group of tilt lug grooves (G2) is disposed in the tread face portion in an arrangement corresponding to an arrangement obtained by separating a reverse chevron into two halves symmetrically with respect to the tire equator such that one half of the reverse chevron is provided on the right side of the tread face portion and the other half of the reverse chevron is provided on the left side of the tread face portion, and then offsetting the two reverse chevron halves in the circumferential direction, wherein tilt lug grooves of the second group of tilt lug grooves (G2) on the right side of the tread face portion are disposed substantially in parallel with each other and tilt lug grooves of the second group of tilt lug grooves (G2) on the left side of the tread face portion are disposed substantially in parallel with each other; and (e) said G1 and G2 groups are alternately disposed in the circumferential direction, wherein:

a ratio Lmax/W of a maximum length Lmax of the tilt lug groove within said respective groups of tilt lug grooves to the surface length W along one side of the tread from the equator of the tire to the edge of the tread meets $0.4 \leq Lmax/W \leq 2.0$ in the no-load state in which the tire is mounted to the standard rim and air is filled to the standard internal pressure, a ratio Lmin/W of a minimum length Lmin of the tilt lug groove within said respective groups of tilt lug grooves to the surface length W along one side of the tread from the equator of the tire to the edge of the tread meets $0.1 \leq Lmin/W \leq 1.0$, two or more tilt lug grooves having the maximum length Lmax and the lug grooves having the minimum length Lmin exist within each group of tilt lug grooves, pitches of said first group of tilt lug grooves are one-third to 1/12 of an entire circumferential length of the tire tread, pitches of said second group of tilt lug grooves are one-third to 1/12 of an entire circumferential length of the tire tread, and said first group of tilt lug grooves and said second group of tilt lug grooves are disposed so that at least one tilt lug groove of said first group on the right side of the tread face portion connects with at least one tilt lug groove of said second group on the right side of the tread face portion, at least one tilt lug groove of said first group on the left side of the tread face portion connects with at least one tilt lug groove of said second group on the left side of the tread face portion, at least two tilt lug grooves of said first group on the left side of the tread face portion do not connect with any one of the tilt lug grooves of said second group on the left side of the tread face portion, and at least two tilt lug grooves of said second group on the right side of the tread face portion do not connect with any one of the tilt lug grooves of said first group on the right side of the tread face portion.

2. The pneumatic radial tire for a motorcycle according to claim 1, further comprising at least one center rib continuing in the circumferential direction on the equator of the tire; wherein a ratio CW/W of a width of the center rib CW to the surface length W along one side of the tread from the equator of the tire to the edge of the tread is 0.01 or higher and 0.3 or less in the no-load state in which the tire is mounted to the standard rim and air is filled to the standard internal pressure.

3. The pneumatic radial tire for a motorcycle according to claim 1, wherein said two groups of tilt lug grooves are composed of two to four of said pairs of said tilt lug grooves, respectively.

4. The pneumatic radial tire for a motorcycle according to claim 1, wherein the offset in the circumferential direction of said two groups of tilt lug grooves is 1/6 to 1/24 of the entire circumferential length of the tire, respectively.

5. The pneumatic radial tire for a motorcycle according to claim 1, which is mounted on the rear wheel of the vehicle, wherein the groups of tilt lug grooves including tilt lug grooves whose tilt angle with respect to the tire circumferential direction is least and the surface length along the groove is longest among the two groups of tilt lug grooves, when the vehicle advancing direction is seen to be front from above when the tire is mounted to the vehicle, form the shape of the separated chevron on the right and left sides of the tread face.

* * * * *